Dec. 2, 1969 D. J. WARNER 3,482,083
PRODUCTION PACING DEVICE
Filed June 16, 1965 2 Sheets-Sheet 2
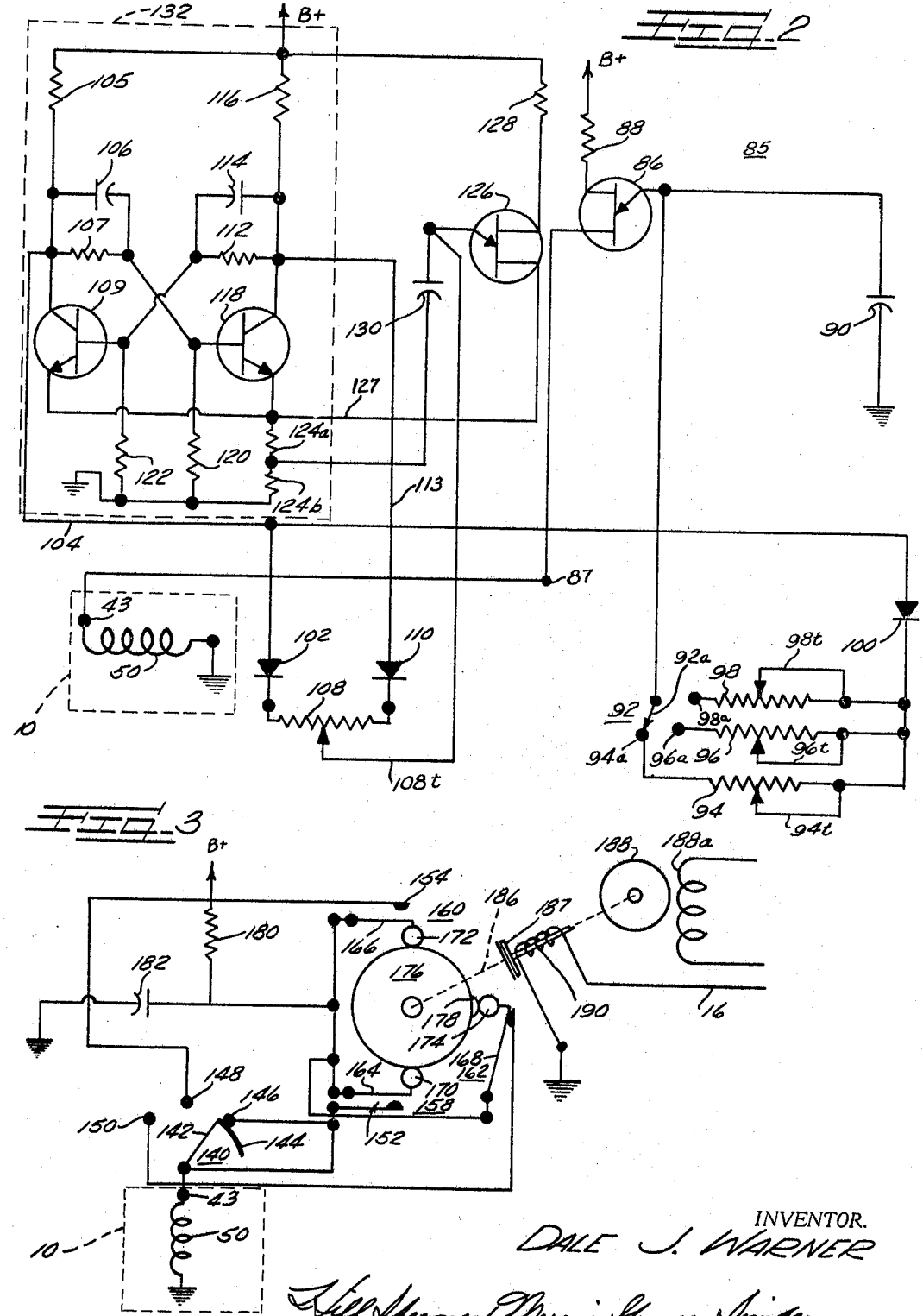
INVENTOR.
DALE J. WARNER
BY ATTORNEYS

United States Patent Office 3,482,083
Patented Dec. 2, 1969

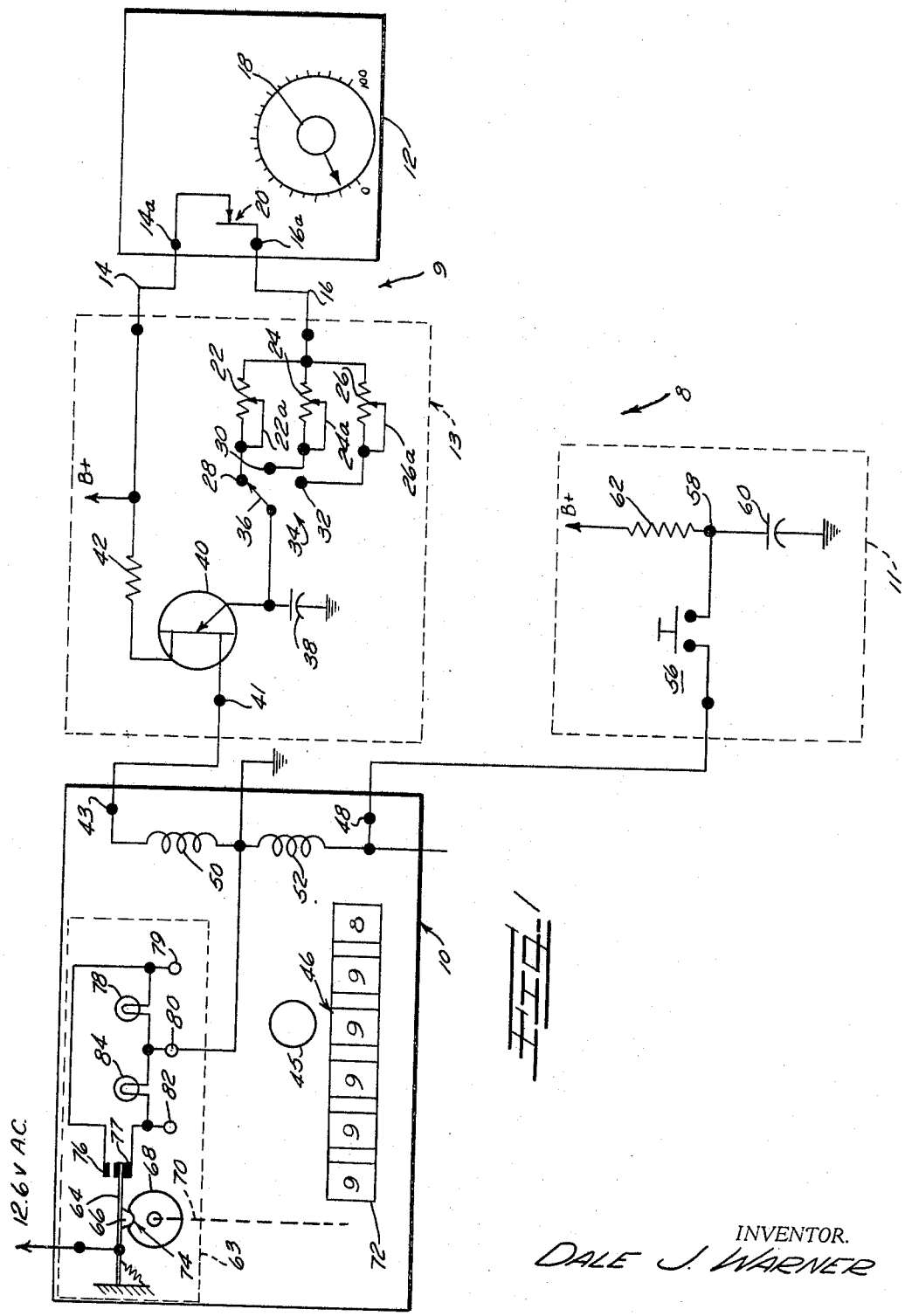

3,482,083
PRODUCTION PACING DEVICE
Dale J. Warner, 5240 S. McVicker Ave.,
Chicago, Ill. 60638
Filed June 16, 1965, Ser. No. 464,522
Int. Cl. G06f 7/38; G06g 7/00
U.S. Cl. 235—92                                    11 Claims

ABSTRACT OF THE DISCLOSURE

A production pacer including means for generating a number of successive scheduled signals at a predetermined rate and, means for generating a number of production signals. A digital counter is actuated in response to the successive scheduled signals and in response to the production signals and operative to display any difference between the number of production signals and the number of scheduled signals.

---

This invention relates to a production pacer, and more specifically to a novel apparatus which indicates the extent to which a production unit is ahead of or behind a predetermined quantitive norm or standard.

In many industries the overall production process is divided into steps or operations, each of which may be performed by numerous productive units, such as a single operator and a machine. In these industries it is a goal to achieve higher production and to utilize the machines and the labor used in operating the machines to achieve better efficiency in productivity.

However, often a worker is unable to space or distribute properly his effort and output over the work day.

Accordingly in accordance with this invention I have provided means by which worker output may be analyzed. This structure includes a scheduled output signal generating means, an actual output signal generating means, and a counter for determining and displaying any numerical differece between the actual output and the scheduled output.

Accordingly, it is a general object of this invention to provide means by which a worker may pace himself so as to achieve more efficient operation.

It is another object to provide means for determining the relative production of various productive units.

A further object of this invention is to provide a device receptive of signals based on actual production and wherein such signals are compared with respect to planned production and which device indicates directly the extent of deviations therefrom.

Yet another object is to provide a device of the type described wherein signals representing scheduled production and signals representing actual production cannot become synchronized with each other even though both may occur at the same average rate.

Yet another object is to provide a device of the type described wherein the scheduled production is directly indicated and readily manually adjusted.

Other objects, features and advantages of the present invention will be readily apparent from the following detailed description of certain preferred embodiments thereof taken in conjunction with the accompanying drawings, in which:

FIG. 1 is a schematic diagram of one embodiment of the invention;

FIG. 2 is a schematic diagram of an alternative embodiment of part of the apparatus of FIG. 1; and FIG. 3 is a schematic diagram of an alternative embodiment of part of the apparatus of FIGS. 1 and 2.

The principles of this invention are particularly useful when embodied in a production pacer as illustrated in FIG. 1, generally indicated by the numeral 8. The pacer 8 includes means for generating a predetermined scheduled output or pacing signal correlated to a preselected schedule of outputs, such means being generally indicated by the numeral 9, a counter 10, and means for generating an actual output signal correlated to the actual output of a productive process, generally indicated by the numeral 11.

The pacing signal generating means 9 comprises a percentage on-off timer 12 and a pulse generator 13. The pulse generator 13 and the timer 12 are interconnected by a pair of electrical connections 14 and 16.

The timer 12 is a conventional, commercially available percentage timer, and has a control dial 18 which enables continuous adjustment of the "on" time from zero to 100 percent. Between the input terminals 14a and 16a of the timer 12 there is a switch 20 which schematically represents the operation of the timer 12. The timer 12 functions to close the contact between the electrical terminals 14a and 16a for a certain percentage of a given time period. This time period is as short as four seconds in one commercial model.

The pulse generator 13 has three adjustable resistors 22, 24 and 26 connected at one end to the timer terminal 16a via the conductor 16. The other ends of the resistors 22, 24 and 26 are respectively connected to a number of contact points 28, 30 and 32 of a scale selector switch 34. Also connected to respective ends of each of the resistors 22, 24 and 26 are a number of adjustable taps 22a, 24a, 26a for changing the effective resistsance of the resistors.

The selector switch 34 has a movable sweep arm 36, shown for illustrative purposes in contact with the contact point 28. The sweep arm 36 is connected to one side of a capacitor 38, the other side of which is grounded. Connected to the capacitor 38 and the sweep arm 36 is the emitter of a unijunction transistor 40. One of the bases of the unijunction transistor 40 is connected to a direct current source of positive or B+ voltage through a resistsor 42. The same source of positive voltage is also connected though the line 14 to the terminal 14a of the timer 12. The second base of the unijunction transistor 40 is connected to a pulse output terminal 41 and from there to an input terminal 43 of the direct current electrical impulse counter 10.

The counter 10 has a digital display 46 and registers an increase in the number displayed on the digital display 46 in response to a voltage pulse received at a terminal 48 and subtracts a digit from the numbers registered on the display 46 in response to a voltage pulse at the terminal 43. The counter actuating circuit is depicted by an inductor 50 connected between the terminal 43 and ground, and by an inductor 52 connected between the terminal 48 and ground. The counter 10 operates so that a pulse at its minus terminal 43 will convert the display 000000 to 999999, as is common with such counters. Also provided on the counter 10 is a reset button 45 for setting the digital display 46 back to zero through known structure.

The counter 10 has an indicating means generally indicated by the numeral 63 for indicating whether the numerals displayed exceed, or are less than, a scheduled output.

The means 63 includes a spring-biased switch blade 64 electrically connected to an alternating current source of low voltage, such as 12.6 v. A.C. A source for such a voltage is a low voltage winding of a power supply transformer that may be used in developing the D.C. B+ voltage. Any other AC- or DC-source suitable to power an indicating lamp could be used. The switch blade 64 engages, by means of an insulated roller or follower 66 with a cam 68 which is ganged to or rotatably driven by the highest value number wheel 72 which acts through a mechanical connection 70. If desired, a number wheel or other wheel that functions as part of the counting mechanism may be used as the cam 68. As the display wheel 72 is moved to its ten position, the cam 68 assumes corresponding positions. The cam 68 has an indentation 74 at a point where the roller 66 can enter it when the cam 68 is at the angular position corresponding to a showing of "9" by the number wheel 72. The switch blade 64 coacts with a pair of contacts 76 and 77. The contact 76 is positioned to be in engagement with the blade 64 whenever the roller 66 is not within the indentation 74. However, when the roller 66 moves into the indentation 74, the blade 64 moves into engagement with the contact 77. The contact 76 is connected to an output terminal 79 and to an indicating lamp 78 which preferably emits green light. The other terminal of the lamp 78 is connected to a grounded terminal 80. The contact 77 is electrically connected to a second output terminal 82 and a second indicating lamp 84, which preferably emits red light.

The means 11 for generating a signal correlated with the actual output of a production process comprises a push button switch 56, connected with the plus terminal 48 of the counter; the switch 56 is connected in series with the plus terminal 48 and a junction point 58 between a series connected charging capacitor 60 and a resistor 62. The other side of the resistor is connected to a direct current source of positive voltage B+ and the other side of the capacitor 60 is connected to ground.

OPERATION

The actual rate of production is indicated by pulses generated by the means 11. The preselected scheduled rate of production is represented by pulses generated by the means 9. The counter 10 is responsive to the difference in number of pulses and indicates the number that actual production is ahead of or behind the preselected schedule. The counter 10 also indicates by the indicating means 63 whether actual production is ahead of or behind scheduled production. The counter 10 is reset to 000000 by operating the push button 45.

A B+ potential is applied through the relatively low resistance resistor 42 to one of the bases of the unijunction transistor 40, thereby biasing the other base, and a negligible leakage current passes through the terminals 41 and 43 and the minus circuit 50 to ground, without actuating the counter 10.

The percentage On-Off timer 12 operates to close the switch 20 for a selected percentage of each time interval as determined by the setting of the dial 18. When the switch 20 is closed, current flows from the positive voltage source B+ through one of the relatively high resistance resistors 22, 24 or 26, as determined by the setting of the range selector switch 34, to the ungrounded side of the capacitor 38. The voltage across the capacitor 38 builds up until the bias on the unijunction transistor 40 is overcome, at which voltage the transistor 40 is triggered. When this occurs, current flows from the capacitor through the transistor 40 from the emitter to the base connected to the terminal 41 thus discharging the capacitor 38 and generating a positive pulse of voltage connected to the terminal 43. The unijunction transistor 40 continues to pass current from its emitter to its base until the capacitor 38 is substantially discharged. The unijunction transistor 40 then resumes its non-conductive condition until the voltage across the capacitor 38 again reaches the triggering level. With a constant B+ voltage supply and the switch 20 closed, the time between pulses and the pulse rate is determined by the value of the capacitor 38 and the effective size of the resistor 22, 24 or 26 to which the switch arm 36 is connected. Each of the resistors 22, 24 and 26 is of such a size as to relate the pulse rate of the pulse generator 13 by a scale factor. For example, the setting of the sweep arm 36 at the contact point 28 could establish a pulse rate of 1000 per hour, the setting of the arm 36 at the terminal 30 could establish a rate of 2000 per hour, and the setting of the arm 36 at the terminal 32 could establish a rate of 5000 per hour. It has been found that due to variations in the unijunction transistor constants, it is desirable to be able to adjust the effective value of each resistor 22, 24, 26 so as to establish the basic pulse rate more precisely. This is done at the factory by adjusting the taps 22a, 24a, 26a, while measuring the pulse rate. In the completed pacer, in normal operation, only the scale selector switch 34 is to be adjusted.

The primary function of the percentage On-Off timer 12 is to set the exact number of pulses to be delivered during a period. By maintaining the switch 20 closed for a percentage of time selected by the adjustable dial 18, that selected percentage of the basic pulse rate determined by the setting of the scale selector switch 34 is delivered to the minus terminal 43. For example, if the setting of the scale selector switch 34 determines a basic pulse rate of 1000 pulses per hour, and the dial 18 of the timer 12 was set at 75 percent, 750 pulses would be delivered per hour to the minus terminal 43.

The use of the percentage timer 12 to control the pulse generator 13 has several advantages over a pulse generator that provides pulses at a steady adjustable rate. A disadvantage that may exist for the latter type of pulse generator is that the output can become synchronous with the actual output signal from means 11. When this occurs, the counter 10 may respond unreliably by either recording only the minus pulses or recording only the plus pulses. Either of these alternatives would lead to a large error after a period of time.

A further advantage of the described signal generator means 9 is that it enables the user to select the lowest available scale, thereby providing for more accuracy and precision in the selection of the output rate.

The production output switch 56 may be operated by hand on completion of one production cycle. Preferably, the switch 56 is operated automatically once per cycle by the production equipment employed. The production output signaling means 11 operates to deliver a single pulse to the plus terminal 48 of the counter 10 in response to the closing of the push button switch 56. With the switch 56 open, the capacitor 60 will charge until the voltage across it is equal to that of B+. When the push button switch 56 is closed, the capacitor 60 discharges through the switch 56, the terminal 48 and the coil 52 to ground. The resistor 62 serves to limit the current through the coil 52, should the switch 56 be kept closed, and to prevent additional plus registrations in the counter 10 resulting from a long depression of the switch 56.

So long as the number of pulses from the production means 11 exceeds the number of pulses from the pulse generator 13, the counter 10 will indicate numerically the extent to which actual production is exceeding the preselected schedule. During such a condition, the cam follower 66 rides high on the cam 68, thereby holding the switch blade 64 in circuit with the contact 76 to energize the green lamp 78.

Whenever the total shown on the digital display 46 goes negative (indicated by 999999 (−1), 999998 (−2), etc.) the cam follower 66 enters the indentation 74, allowing the blade 64 to break circuit with the green lamp 78 and make circuit with the red lamp 84.

In use, the indicating lights 78, 84 may be separated from the counter and/or an additional light or lights may be energized from the terminals 79, 80, 82.

The pacer 8 is capable of many applications in productive processes. By way of illustration only, the lamps 84, 78 may be visible to the operator of a machine engaged in repetitive output operations while the counter 10 could be remotely placed, for example, in the foreman's office. When a plurality of machines is operating under similar scheduled rates of output, a plurality of counters may be operated by the pulse generating means 9 having suitable current rating by connecting them in parallel to the pulse output terminal 41 and ground.

One use of the described pacer is in keeping constant the flow of work involving a number of successive, separate operations by different productive units. In this case, the output of one producing unit forms the input for the next, and it is desirable to have each unit operating continuously at the same rate with as little as possible "work-in-process" or partly finished goods awaiting the next processing step.

In these circumstances, the pacer schedule output signal generator would operate a number of counters at the successive production units. With a common pace set for each operation, excessive "work-in-process" as well as production slowdowns can be avoided.

In FIG. 2 there is represented a second construction, indicated generally by the numeral 85 for the standard or schedule signal generating means 9. This construction replaces the function of the timer 12 and the pulse generator 13 and operates to impress electrical pulses upon the minus terminal 43 of the counter 10. The terminal 43 and the counter coil 50 affixed between it and ground are connected to an output terminal 87 of the schedule signal generating means 85. The terminal 87 is in turn connected to one base of a unijunction transistor 86 which forms a part of the means 85. The other base of the transistor 86 is connected to a direct current source of positive potential, symbolized by B+ through a resistor 88. The emitter of the transistor 86 is connected in series to a capacitor 90, the other side of which is connected to ground. In parallel circuit connection to the capacitor 90 is a scale selector switch 92 which has a sweep arm 92a movably supported to connect to one of three switch terminal contacts 94a, 96a, 98a. The switch 92 enables the emitter of transistor 86 to be selectively connected to a one of three scale resistors 94, 96 or 98, each of which is connected to the corresponding switch terminals 94a, 96a or 98a. The resistors 94, 96 and 98 are each provided with a resistance adjusting tap 94t, 96t, 98t connected to one end of the respective resistors and to a diode 100. The emitter of the diode 100 is connected to the emitter of a second diode 102. The respective emitters of the diodes 100 and 102 are also connected through an electrical connecting line 104 to one side of a capacitor 106 and a resistor 107 in parallel circuit connection. The junction line 104 is connected to a voltage source B+ through another resistor 105 and is further connected to the collector of an NPN transistor 109. The base of the diode 102 is connected to one end terminal of a rheostat 108. The other end terminal of the rheostat 108 is connected to the base of a third diode 110 which has its emitter connected by line 113 to the base of a second resistor capacitor parallel combination provided by the resistor 112 and the capacitor 114. The junction of the capacitor 114 and the resistor 112 with the emitter of the diode 110 is connected to the voltage source B+ through a resistor 116 and is further connected to the collector of a second NPN transistor 118. The opposite end of the capacitor 106 and of the resistor 107 are connected to the base of the transistor 118 which is also connected to ground through a resistor 120. Similarly the other ends of the capacitor 114 and the resistor 112 are connected to the base of the transistor 109 which is connected to ground through a resistor 122. The emitters of the transistors 109 and 118 are connected together and to ground through a series connected pair of resistors 124a and 124b.

The emitters of the transistors 109 and 118 are further connected to one base of a second unijunction transistor 126 by a line 127. The second base of the unijunction transistor 126 is connected to B+ through a resistor 128. The emitter of the unijunction transistor 126 is connected through a capacitor 130 to the junction of the series connected resistors 124a, 124b and to the movable tap 108t of rheostat 108.

The flip-flop circuit 132 is a conventional circuit well known in the art which, when initially connected to the B+ voltage source, achieves a stable state with either transistor 109 or transistor 118 conducting. The initial conducting transistor is determined in a random manner. Circuit 132 has the property that with one of the transistors 109, 118 conducting it will continue to conduct until a triggering pulse is received at line 127. The reception of such a pulse biases the conducting transistor into non-conduction and biases the previously non-conducting transistor into non-conduction. This new state will continue until another pulse is received at line 127, whereupon the conduction relationship will "flip" back. This charge is achieved quickly and the process may be continued indefinitely.

Lines 104 and 113 constitute the outputs of the flip-flop circuit 132. When the circuit is in the state wherein transistor 109 is in conduction and transistor 118 is not, output line 104 is at a relatively low potential and output line 113 is at a relatively high potential. When transistor 118 is conducting and transistor 109 is biased into non-conduction, line 104 is at a low potential and line 113 is high.

Both output voltages from lines 104 and 113 are applied through blocking diodies 102, 110 to rheostat 108. Current from the higher potential line flows through rheostat 108 through tap 108t to one side of the charging capacitor 130. The other side of the capacitor 130 is held at a slightly positive potential conveniently obtained from the junction of resistors 124a and 124b. The charging capacitor 130 continues to charge until a critical voltage is reached and unijunction transistor 126 allows the capacitor 130 to discharge through line 127. This discharge pulse triggers or reverses the conduction state of the flip-flop circuit 132.

It should be noted that for purposes of the charging capacitor 130, the resistance of rheostat 108 is effective by only the value of resistance between the higher voltage one of lines 104 or 107 and tap 108t. The resistive value is different for line 104 from that of line 113 for any setting of tap 108t other than the center position of rheostat 108. Any difference in resistive values, of course, determines different charging times before the capacitor 130 reaches the critical discharge voltage. Also, the "On" time of each output line, or the time that the circuit 132 remains in one of its stable conduction states, is therefore also different. By adjusting the position of the tap 108t, the percentage of time that the flip-flop circuit 132 remains in one of its two stable states can be varied. Thus, the flip-flop circuit 132, the rheostat 108, the capacitor 130, and the unijunction transistor 106 connected as described, produce an effect which is similar to that of the timer 12 since the relatively high output voltage applied to the line 104 is present for a percentage of time determined by the setting of the tap 108t on the rheostat 108.

This high output voltage is applied through the blocking diode 100 to the scale resistors 94, 96 and 98 and causes a current to flow through the particular resistor connected to the charging capacitor 90 by the switch 92. This charging current charges the capacitor 90 until the triggering voltage of the unijunction transistor 86 is reached. At this time, the unijunction transistor 86 allows a capacitor 90 to discharge through its emitter and its base connected to the puulse output terminal 87. In this manner the above described circuit delivers positive voltage pulses to the minus terminal 43 of the counter at an overall rate determined by the setting of the scale selector switch 92 and the position of the movable tap 108t on the rheostat 108. In this, the result obtained by this circuit is similar to the result obtained by the schedule pulse generator 13 of the embodiment depicted in FIG. 1.

In FIG. 3 there is depicted another structure for achieving the general result of the pulse generator 13 of FIG. 1.

Connected to the counter minus terminal 43 in series with the minus coil 50 is a wiper switch 140. The switch 140 has a sweep arm 142 which has a wiper 144 which can connect and bridge two switch contacts, such as contacts 146 and 148 or 148 and 150. The circuit formed through the contacts 146 and 144 is shunted, and the contact 146 may be engaged alone. Each of the terminals 146, 148 and 150 is connected respectively to one switch contact point 152, 154 and 156 of normally open contact switches 158, 160 and 162 disposed about a wheel 176. The switches 158, 160 and 162 comprise the respective contact points and oppositely disposed movable switch blades 164, 166, 168. Each of the blades 164, 166 and 168 has a depending roller or cam follower 170, 172, resting upon the wheel 176. The wheel 176 is equipped with a protrusion 178 which functions as a cam and engages and moves the cam follower 170, 172, 174 resting upon the wheel 176. The wheel 176 is equipped with a protrusion 178 which functions as a cam and engages and moves the cam followers 170, 172, 174 for closing and opening switches 158, 160, 162. The switch blades 166, 164 and 168 are each electrically connected to the junction between a series connected resistor 180 and a capacitor 182. The other end of the capacitor 182 is connected to ground while the free end of the resistor 180 is connected to a direct current source of positive potential B+. The wheel 176 is ganged by a mechanical connection generally indicated by dashed line 186 through a solenoid controlled clutch plate 187 to an electric motor 188 having a separately excited field winding 188a. The motor 188 may be any convenient AC- or DC-motor and is operated continuously. The solenoid 190 serves to control the clutch plate 187 to selectively engage or disengage the motor 188 to the wheel 176. One end of the solenoid 190 is connected to ground and the other end is connected to the line 16, the output of the percentage on-off timer 12.

In operation, the sweep arm 142 of the switch 140 is positioned to connect either the switch 158, or the switches 158 and 160, or the switches 158, 160 and 162 to the terminal 43. This determines whether one, two or three pulses will be delivered to the terminal 43 for each revolution of the wheel 176, and thus acts as a scale selector. The motor 188 will operate the wheel 176 for that percentage of time determined by the output of the timer 12 to the clutch solenoid 190. When the timer 12 has closed contact, the solenoid 190 moves the clutch plate 187 into engagement with the ganging mechanism 186, and the wheel 176 turns. When the timer 12 is open, the solenoid 190 disengages the clutch plate 187 from the mechanism 186 and the wheel 176 stops.

By way of illustration, the following values for the described circuit elements may be used:

| | |
|---|---|
| Resistors 22, 94 | 200K ohms |
| Resistors 24, 96 | 150K ohms |
| Resistors 26, 98 | 200K ohms |
| Resistors 42, 86 | 330 ohms |
| Resistor 62 | 10K ohms |
| Resistors 107, 112 | 2.2K ohms |
| Resistors 105, 116 | 100 ohms |
| Resistors 120, 122 | 3.9K ohms |
| Resistors 124a, 124b | 10 ohms |
| Resistor 128 | 470 ohms |
| Capacitor 38 | 35 mfd. |
| Capacitors 60, 90 | 35 mfd. |
| Capacitors 106, 114 | 0.1 mfd. |
| Capacitor 130 | 100 mfd. |
| Unijunction transistors 40, 86, 126 | 2N2160 |
| Diodes 100, 102, 110 | IN1692 |
| NPN transistors 109, 118 | 2N2714 |
| Rheostat 108 | Bourns 3400 10 turn 250K ohms |

An AC-operated counter may be used in the described circuit if DC-operated relays were placed between the counter terminals and an appropriate AC-source. In this event, the coil 50 would represent the operating coil of the DC-relay and the described circuits would be used.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim as my invention:

1. A production pacer for use in conjunction with a production process involving a succession of operations constituting outputs, comprising:
    (a) means for generating at a predetermined rate a periodic succession of schedule electrical pulses;
    (b) a timer having a switch coupled to said means and operative to energize said schedule pulse generating means for a preselected percentage of time to reduce the number of schedule electrical pulses per unit time to a fraction of the number of pulses available at said predetermined rate:
    (c) means for generating a number of production electrical pulses; and
    (d) a counter operative in response to the reduced number of said schedule electrical pulses and to said production electrical pulses and operative to determine and display in digital form any difference between the number of production electrical pulses and the reduced number of said schedule electrical pulses.

2. A production pacer for use in conjunction with a production process involving a succession of operations constituting outputs, comprising:
    (a) means for generating at one of the plurality of predetermined rates a periodic succession of schedule electrical pulses, said means including a manually adjustable scale selector means for selecting said one of said plurality of rates;
    (b) a timer having a switch coupled to said schedule pulse generating means and operative to energize said schedule pulse generating means a preselected percentage of time for altering the selected rate of schedule pulses to a rate which is less than that of the selected rate, said timer including a manually adjustable selector means for varying said preselected percentage;
    (c) means for generating a number of production electrical pulses; and
    (d) a counter operative in response to said schedule electrical pulses at the altered rate and to said production electrical pulses and operative to determine and to display in digital form any difference between in the number of said production electrical pulses and the number of said schedule electrical pulses.

3. A production pacer for use in conjunction with a production process involving a succession of operations constituting outputs, comprising:
    (a) means for generating periodic pulses including means for adjusting the on-off ratio of said pulses;
    (b) means operable to generate successive pulses at a predetermined rate connected to said means for generating periodic pulses and operatively controlled thereby to produce a preselected percentage number of its pulse capability per unit of time as a function of the on-off ratio of said periodic pulses as production schedule pulses;
    (c) means for generating production pulses; and
    (d) a counter operative in response to said production schedule pulses and to said production pulses including means for displaying any difference between the number of production pulses and the number of schedule pulses.

4. A production pacer for use in conjunction with a production process involving a succession of operations constituting outputs, comprising:

(a) means for generating at one of a plurality of predetermined rates a periodic succession of schedule electrical pulses, said means including a unijunction transistor biased to be triggered by a resistive-capacitance timing circuit and including a scale selector switch for manually varying the effective resistive value of said timing circuit for selecting one of a said plurality of rates;

(b) a timer having a switch coupled to said schedule pulse generating means and operative to energize said schedule pulse generating means a preselected percentage of time, said timer including a manually adjustable selector for selecting said preselected percentage from a range of percentages;

(c) means for generating a number of production electrical pulses;

(d) a counter operative in response to said schedule electrical pulses and to said production electrical pulses and operative to determine and to display in digital form any difference between the number of said production electrical pulses and the number of said schedule electrical pulses; and (e) means controlled by said counter and involving at least one lamp operative to indicate whether the number of said schedule pulses exceeds the number of said production pulses.

5. A production pacer for use in conjunction with a production process involving a succession of operations constituting outputs, comprising:

(a) means for generating at one of a plurality of predetermined rates a periodic succession of schedule electrical pulses, said means including a unijunction transistor biased to be triggered by a resistive-capacitance timing circuit and including a scale selector switch for manually varying the effective resistive value of said timing circuit for selecting one of a said plurality of rates;

(b) a timer having a switch coupled to said schedule pulse generating means and operative to energize said schedule pulse generating means a preselected percentage of time, said timer including a manually adjustable selector for selecting said preselected percentage from a range of percentages;

(c) means for generating a number of production electrical pulses;

(d) a counter operative in response to said schedule pulses and to said production pulses and operative to determine any difference between the number of production pulses and the number of schedule pulses, and having a series of number wheels for displaying said difference in digits; and (e) means controlled by the highest value number wheel and operative to indicate whether the number of said schedule pulses exceeds the number of said production pulses.

6. A production pacer for use in conjunction with a production process involving a succession of operations constituting outputs, comprising:

(a) means for generating at one of a plurality of predetermined rates a periodic succession of schedule electrical pulses, said means including a unijunction transistor having a first base connected to a source of biasing voltage, having a second base coupled to an output terminal and having an emitter connected to a charging capacitor and to a source of direct current, charging current through a selector switch and one of a plurality of timing resistors, said selector switch being manually adjustable to select different ones of said plurality of timing resistors to select said one of said plurality of rates;

(b) a timer having a switch coupled to said schedule pulse generating means and operative to energize said pulse generating means by making electrical circuit with said source of charging current by closing said switch coupled to said schedule pulse generating means a preselected percentage of time, said timer including a manually adjustable percent selector for selecting said preselected percentage from a range of percentages;

(c) means for generating a number of production electrical pulses, said production pulse generating means including a manually operative switch coupled to a charging capacitor and a current limited direct current voltage source;

(d) a counter operative in response to said schedule electrical pulses and to said production electrical pulses and operative to determine any difference between the number of said production pulses and the number of said schedule pulses and having a series of number wheels for displaying said difference in digits; and (e) means controlled by the highest value number wheel of said counter series of number wheels and operative to indicate whether the number of said schedule pulses exceeds the number of said production pulses, said indicating means including a first lamp which is activated to emit light of a first color whenever said highest value number wheel displays a low value numeral, and a second lamp which is activated to emit light of a second color whenever said highest value number wheel displays a high value numeral.

7. A production pacer for use in conjunction with a production process involving a succession of operations constituting outputs, comprising:

(a) means for generating a number of successive schedule electrical pulses at a predetermined rate, said means comprising a first unijunction transistor having a first base connected to a direct current bias source, its second base connected to a pulse output terminal, and its emitter connected to a triggering circuit, said triggering circuit being coupled to a percentage timer circuit which includes a manually adjustable rheostat for selecting a percentage of time from a range of percentages and a flip-flop circuit and a second unijunction transistor, interconnected so that the adjustment of said rheostat varies the on-time of said flip-flop circuit;

(b) means for generating a number of production electrical pulses; and (c) a counter operative in response to said schedule electrical pulses and to said production electrical pulses and operative to determine and to display in digital form any difference between the number of production electrical pulses and the number of schedule electrical pulses.

8. A production pacer for use in conjunction with a production process involving a succession of operations constituting outputs, comprising:

(a) means for generating a number of successive schedule electrical pulses at a predetermined rate, said means comprising a first unijunction transistor having a first base connected to a direct current bias source, a second base constituting the output of the means and an emitter connected to a scale selector switch which is manually operable to connect said emitter to one of a plurality of resistors, and said emitter further connected to a charging capacitor, said capacitor being charged through said selected resistor and said switch from the output current of a bi-stable flip-flop circuit coupled to said resistor, said flip-flop circuit coupled to said resistor, said flip-flop circuit being connected with a triggering second unijunction transistor whose triggering rate is determined by the setting of a manually variable rheostat to vary the percentage of time that said output current of said flip-flop circuit;

(b) means for generating a number of production electrical pulses, said production pulse generating means including a manually operative switch coupled to a charging capacitor and a current limited direct current voltage source;

(c) a counter operative in response to said schedule electrical pulses and to said production electrical pulses and operative to determine any difference between the number of said production pulses and the number of said schedule pulses and having a series of number wheels for displaying said difference in digits; and (d) means controlled by the highest value number wheel of said counter series of number wheels and operative to indicate whether the number of said schedule pulses exceeds the number of said production pulses, said indicating means including a first lamp which is activated to emit light of a first color whenever said highest value number wheel displays a low value numeral, and a second lamp which is activated to emit light of a second color whenever said highest value number wheel displays a high value numeral.

9. A production pacer for use in conjunction with a production process involving a succession of operations constituting outputs, comprising:

(a) means for generating at a predetermined rate a periodic succession of schedule electrical pulses, said means including a charging capacitor connected in series with a current limited direct current voltage source, a cam wheel and a cam follower operated switch for discharging said capacitor in following said cam wheel, and means for regulating the rotation of said cam wheel;

(b) a timer having a switch coupled to said means and operative to energize said schedule pulse generating means a preselected percentage of time;

(c) means for generating a number of production electrical pulses; and (d) a counter operative in response to said schedule electrical pulses and to said production electrical pulses and operative to determine and to display in digital form any difference between the number of said production electrical pulses and the number of said schedule electrical pulses.

10. A production pacer for use in conjunction with a production process involving a succession of operations constituting outputs, comprising:

(a) means for generating at a predetermined rate a periodic succession of schedule electrical pulses, said means including a charging capacitor in series with a current limited charging voltage source and in parallel circuit with a plurality of cam follower operated switches, said cam followers following a cam wheel operatively coupled through disengageable clutch means to an electric motor for rotation of said cam wheel at a constant speed;

(b) a timer having a switch coupled to said clutch means of said schedule pulse generating means and operative to engage said electric motor and said cam wheel for a preselected percentage of time, said timer including a manually adjustable percent selector for selecting said percentage of time from a range of percentages;

(c) means for generating a number of production electrical pulses;

(d) a counter operative in response to said schedule pulses and to said production pulses and operative to determine any difference between the number of production pulses and the number of schedule pulses, and having a series of number wheels for displaying said difference in digits; and (e) means controlled by the highest value number wheel and operative to indicate whether the number of said schedule pulses exceeds the number of said production pulses.

11. A production pacer for use in conjunction with a production process involving a succession of operations constituting outputs, comprising:

(a) means for genarting at a predetermined rate a periodic succession of schedule electrical pulses, said means including a charging capacitor in series with a current limited charging voltage source and in parallel circuit with a plurality of cam follower operated switches, said cam followers following a cam wheel operatively coupled through a disengageable clutch means to an electric motor for continuous rotation of said cam wheel at a constant speed, said means further including a manually operable scale selector switch for connecting selected ones of said cam follower operated switches to the output of said schedule pulse generating means;

(b) a timer having a switch coupled to said clutch means of said schedule pulse generating means and operative to engage said electric motor and said cam wheel for a preselected percentage of time, said timer including a manually adjustable percent selector for selecting said percentage of time from a range of percentages;

(c) means for generating a number of production electrical pulses, said production pulse generating means including a manually operative switch coupled to a charging capacitor and a current limited, direct current voltage source;

(d) a counter operative in response to said schedule electrical pulses and to said production electrical pulses and operative to determine any difference between the number of said production pulses and the number of said schedule pulses and having a series of number wheels for displaying said difference in digits; and (e) means controlled by the highest value number wheel of said counter series of number wheels and operative to indicate whether the number of said schedule pulses exceeds the number of said production pulses, said indicating means including a first lamp which is activated to emit light of a first color whenever highest value number wheel displays a low value numeral, and a second lamp which is activated to emit light of a second color whenever said highest value number wheel displays a high value numeral.

References Cited

UNITED STATES PATENTS

| | | |
|---|---|---|
| 2,344,497 | 3/1944 | Cooney. |
| 2,985,368 | 5/1961 | Kohler. |
| 3,022,943 | 2/1962 | Dunn. |
| 3,242,320 | 3/1966 | Stout. |
| 3,112,067 | 11/1963 | Ernest. |
| 3,321,704 | 5/1967 | Mann. |
| 3,275,987 | 9/1966 | Mann. |

MAYNARD R. WILBUR, Primary Examiner

J. M. THESZ, JR., Assistant Examiner